Dec. 19, 1967   O. M. HART   3,359,527
PORTABLE INSULATED ELECTRIC DISTRIBUTION APPARATUS
Filed Aug. 23, 1965   2 Sheets-Sheet 1
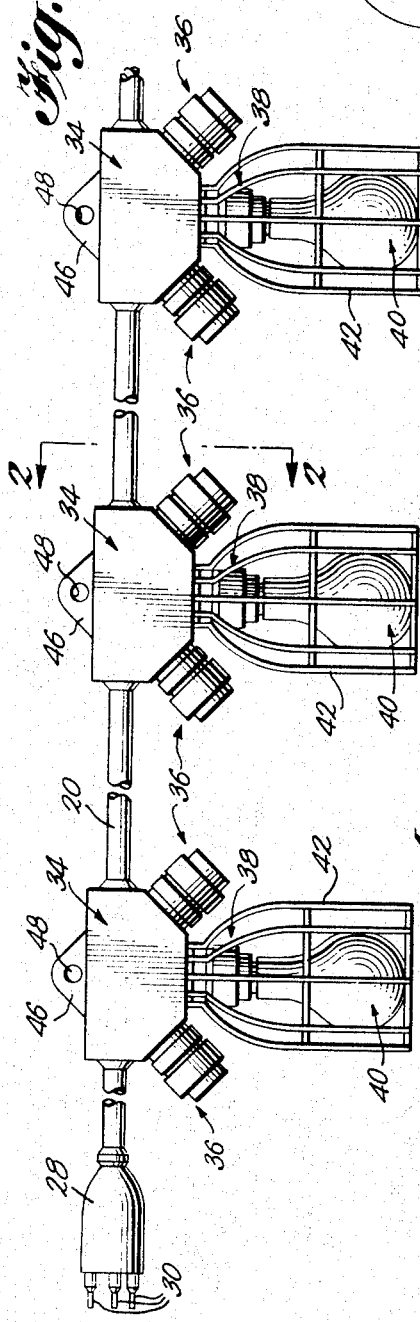
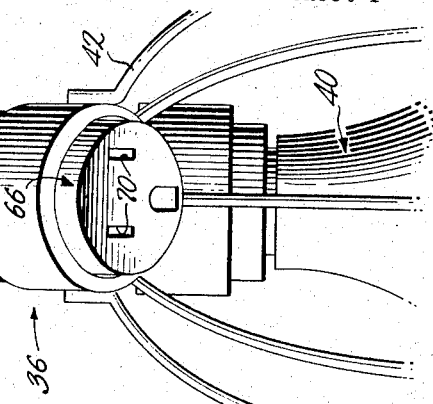
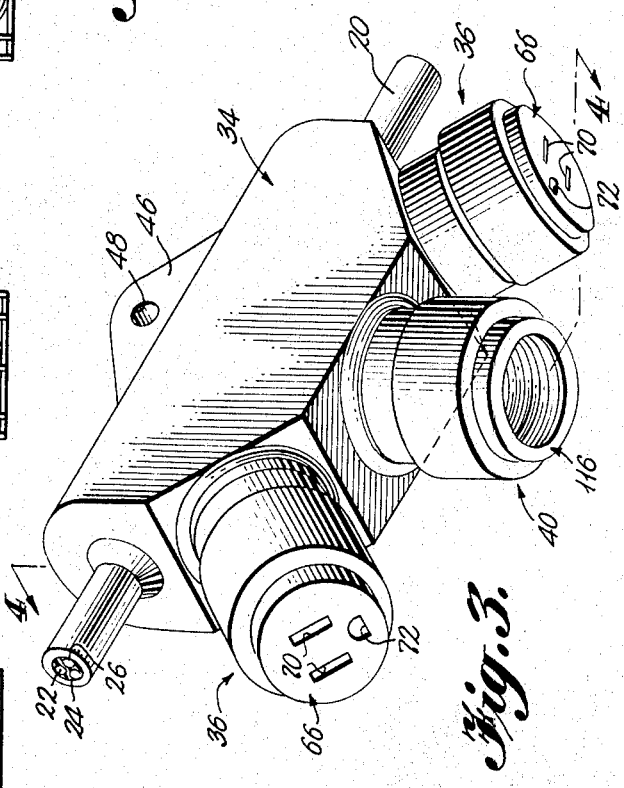
INVENTOR
Oliver M. Hart
BY Shoemaker and Mattare
ATTORNEYS Dec. 19, 1967  O. M. HART  3,359,527
PORTABLE INSULATED ELECTRIC DISTRIBUTION APPARATUS
Filed Aug. 23, 1965  2 Sheets-Sheet 2
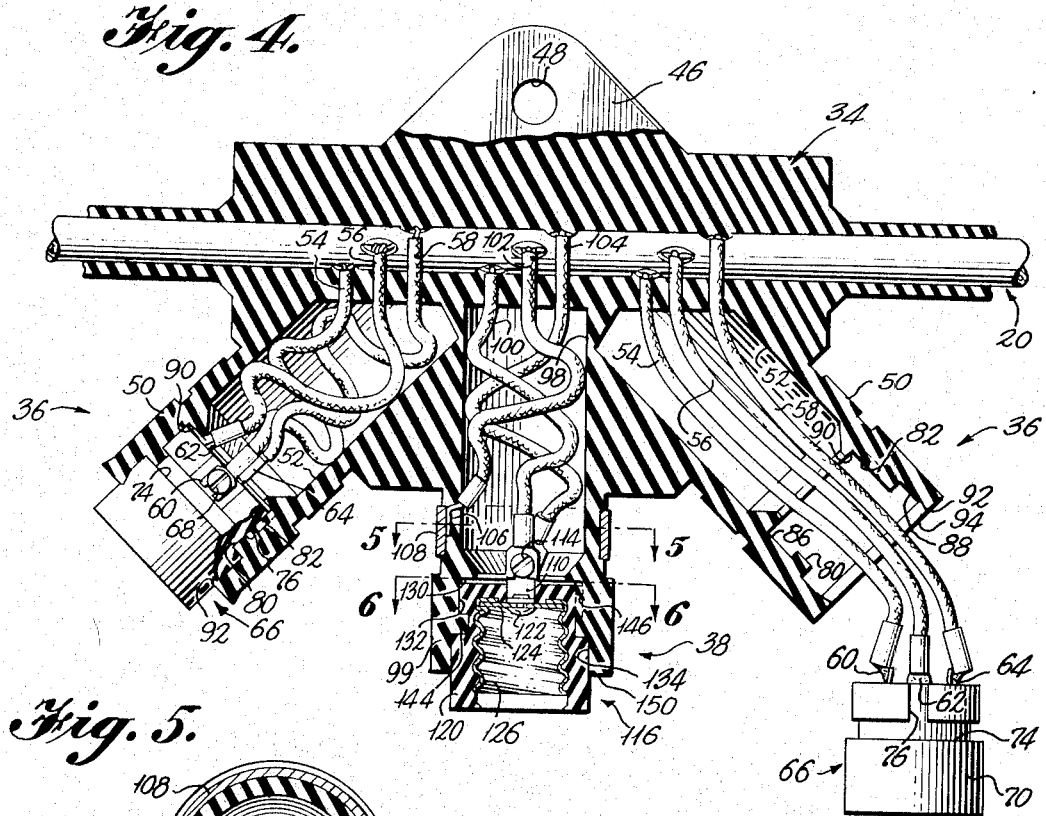
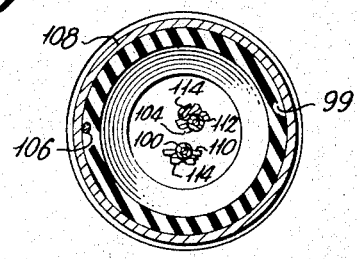
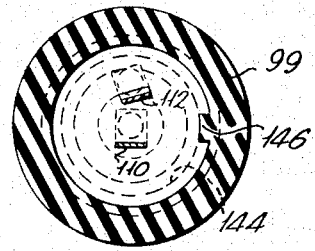
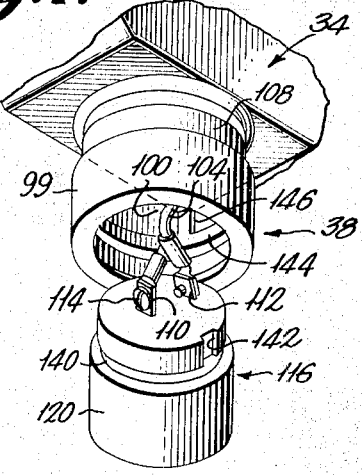
INVENTOR
Oliver M. Hart
BY Shoemaker and Mattare
ATTORNEYS

United States Patent Office 3,359,527
Patented Dec. 19, 1967

3,359,527
PORTABLE INSULATED ELECTRIC
DISTRIBUTION APPARATUS
Oliver M. Hart, West Cornwall, Conn. 06796
Filed Aug. 23, 1965, Ser. No. 481,583
5 Claims. (Cl. 339—59)

ABSTRACT OF THE DISCLOSURE

A body of insulation material molded to an electric cable has one or more cavities formed therein and a replaceable electrical connector means is held in place within one end of the cavity and prevented from rotating with respect thereto. The connector means may be pulled out of the cavity for replacement and repair in the field.

---

The present invention relates to new and novel portable insulated electric distribution apparatus, and more particularly to such apparatus including readily replaceable portions so that the apparatus can be repaired in a simple manner in the field.

The present invention provides a means for incorporating a plurality of spaced electric outlets which may be either power outlets or outlets adapted to receive electric lights and the like and is particularly useful in a so-called "streamer" arrangement wherein a plurality of electrical outlets are provided at spaced points along a conventional insulated electric cable wherever electric lights or power take-off is desired.

These types of insulation are often used in mines and the like wherein it is important to provide a distribution system which is fluid-tight and well insulated. The construction of the present invention includes an electrical cable of relatively conventional construction which remains substantially intact throughout the length thereof to maintain the desired degree of strength while the distribution means may be operatively associated therewith at various points along the length of the cable. The present invention presents an improvement over the arrangement shown in U.S. Patent No. 3,153,119.

A particularly important feature of the present invention is the provision of removable and replaceable electrical connector means in the form of molded insulating socket inserts which can be readily replaced in the field if necessary. In this type of installation, wherein metallic electrical connector components are molded within surrounding bodies of insulating material, the damage which occurs to the construction in the field almost always occurs in the metal parts of the sockets. These metal parts can be crushed by physical force or may be burned up due to electrical short circuits and the like. It is accordingly very desirable to have an arrangement wherein the metallic electrical component can be readily removed if damaged.

In the present invention, the body means of insulation material molded to a conventional electrical cable is provided with cavities formed therein which are adapted to receive molded electrical insulating socket means or inserts. These molded socket means can be readily replaced by hand, and only a simple tool such as a screwdriver or the like is necessary for interconnecting the electrical conductors with the electrical connector means.

These removable and replaceable electrical connector means may be either light sockets or power sockets which can be readily interchanged with one another. In this manner, a single streamer can be used only for lights, only for power or for a combination of lights and power if desired. Furthermore, the power inserts can be of any conventional construction such as parallel blade, crow's foot, twist lock and the like. Additionally, all of the power and light outlets are grounded to provide a built-in safety feature.

The arrangement of the present invention may be employed with various types of insulated cables, and in the illustrated embodiment a 3-conductor cable is illustrated. It should be understood that the apparatus may be employed with cables having any number of conductors in accordance with the particular application involved. For example, a 5-conductor cable may be employed for the express purpose of putting the power sockets on one circuit and the light sockets on another circuit, with each circuit being independently fused. When working in dark places, such as the hold of a ship, this arrangement would be advantageous since if too great a load is placed on the power outlet circuit and a fuse is blown, the light circuit will remain in operation so that a hazardous condition will not be created in such dark places. Additionally, such an arrangement permits the light circuits and power circuits to be remotely controlled by separate switches if desired.

The construction of the present invention also incorporates an arrangement whereby the removable electrical light socket means when in operative position have a fluid-tight seal with the body of insulation molded on the cable. This water-tight seal is provided by a tapered lip formed on the body of insulation material which by its resilient nature snugly engages the outer surface of the associated electrical connector means so as to provide an effective fluid-tight seal therewith.

Both the surrounding body of insulation material and the molded insulating sockets or inserts themselves are damage resistant since they are formed of a resilient deformable material such as neoprene rubber or similar materials, and accordingly, the assembled structure is adapted to absorb much abuse and heavy use in the field.

Repair of the apparatus is facilitated greatly by the fact that the over-all arrangement is of sufficient flexibility to enable the removable inserts to be manually removed and replaced. No special tools at all are required for inserting and removing the electrical connector means, and this offers a great advantage over rigid structures as employed in the prior art.

Additionally, the light sockets in one form of the electrical connector means are interchangeable so that right-hand and/or left-hand light socket threads can be employed as desired.

An object of the present invention is to provide new and novel portable insulated electric distribution apparatus including removable and replaceable electrical connector means whereby the apparatus can be readily repaired in the field or in the shop.

Another object is to provide such apparatus which can be readily repaired by hand with only the most elementary of tools required for making an electrical connection with the connector means.

A further object of the invention is the provision of portable insulated electric distribution apparatus including an electrical cable which is integral throughout the length thereof even though various electrical connectors may be grouped at certain points therealong.

A still further object of the invention is to provide a portable insulated electric distribution apparatus wherein various types of electrical connector means may be used and which are completely interchangeable so as to permit many combinations of electrical connector means to be employed.

Still another object of the invention is to provide distribution apparatus as above described wherein all of the power and light outlets are grounded to provide a built-in safety feature.

A still further object of the invention is to provide electric distribution apparatus which provides completely water-proof light outlets when in operative position.

Yet another object of the invention is the provision of portable insulated electric distribution apparatus wherein the surrounding body of insulation and the molded electrical insulating sockets themselves are formed of flexible damage resistant material so as to provide maximum protection for the components and long life of the assembly.

Other objects and many attendant advantages of the invention will become more apparent when considered in connection with the specification and accompanying drawings, wherein:

FIG. 1 is an elevation partly broken away illustrating a streamer construction according to the present invention;

FIG. 2 is a sectional view taken substantially along line 2—2 of FIG. 1 looking in the direction of the arrows and on an enlarged scale;

FIG. 3 is a bottom perspective view on an enlarged scale of the apparatus of the present invention;

FIG. 4 is a sectional view taken substantially along line 4—4 of FIG. 3 looking in the direction of the arrows;

FIG. 5 is a sectional view taken substantially along line 5—5 of FIG. 4 looking in the direction of the arrows;

FIG. 6 is a sectional view taken substantially along line 6—6 of FIG. 4 looking in the direction of the arrows; and FIG. 7 is a bottom perspective view of a portion of the apparatus illustrating one of the electrical connectors disposed outwardly of its associated cavity.

Referring now to the drawings wherein like reference characters designate corresponding parts throughout the several views, there is illustrated particularly in FIGS. 1–3 inclusive a streamer according to the present invention including a conventional insulated electric cable 20 having three separate electrical conductors 22, 24 and 26 disposed therewithin, these conductors respectively being the black wire, the white wire and the green wire as these cables are conventionally coded. The cable is provided with a plug 28 at one end thereof having three separate prongs 30 which are adapted to be inserted within suitable sockets in a complementary connector means.

The cable 20 is illustrated as having three spaced bodies of insulation material indicated by reference numerals 34 disposed thereon. These various bodies of insulation material and the components associated therewith are substantially identical in construction. Each of the bodies 34 includes various types of outlets, and as illustrated each body of insulation has a pair of power outlets 36 and an electric light outlet 38 which receives a conventional electric light bulb 40. It should be understood that these various types of outlets are interchangeable, and the particular arrangement shown is for the purpose of illustration. A lamp guard 42 is disposed about each of the electric light bulbs to protect the associated bulbs.

Each of the bodies of insulating material also includes a laterally extending portion 46 having a hole 48 formed therethrough, these holes being provided for the purpose of facilitating handling of the apparatus and hanging up of the streamer when so desired. The hole structure may be strengthened by means of metal integrally molded grommet means.

Each of the bodies of insulation are of identical construction, and accordingly a description of one will suffice for all. Referring particularly to FIG. 4, the body of insulation 34 is bonded about the cable and includes two outwardly extending projections 50 which are oriented at approximately right angles to one another and extend downwardly at an angle of approximately 45° from the horizontal as seen in this figure. Cavities 52 are formed within each of projections 50 and extend partly into the main body portion of the body of insulation. Three electrical conductors 54, 56 and 58 are provided within each of these cavities, the conductors being loosely disposed within the cavities and embedded at the upper ends thereof as seen in this figure in the body of insulation. The conductors are each connected with one of the conductors of the insulated cable, the manner of interconnection of conductors 54, 56 and 58 with the conductors of the cable being identical with that disclosed in the aforementioned U.S. patent. This arrangement is such as to provide a completed assembly wherein the structural integrity of the insulated cable is retained so that the electric cable is substantially integral and continuous throughout its length.

The three conductors 54, 56 and 58 provided in each cavity are of sufficient length to extend outwardly of the cavity as indicated in the right-hand portion of FIG. 4 so as to be readily connected and disconnected with respect to an associated removable electrical connector means. As illustrated, conductors 54, 56 and 58 are interconnected respectively with terminals 60, 62 and 64 extending upwardly from the associated connector means indicated in its entirety by reference numeral 66. Each of the conductors may be connected with its terminal by a conventional screw 68 as seen most clearly in the left-hand portion of FIG. 4. Accordingly, the conductors may be readily connected or disconnected with the terminals of one of the removable electrical connector means simply by employing a screw driver for moving the screws 68 into and out of operative position. In order to prevent accidental short circuits when the connector means are removed from the body of insulating material as illustrated in the right-hand portion of FIG. 4, insulating boots or sleeves of dielectric material may be provided in surrounding relationship to the conductors 54, 56 and 58 so that such boots can be slid down over the terminals 60, 62 and 64 in surrounding relationship thereto.

As seen most clearly in FIGS. 2 and 3, the lower end portion of each of the removable connector means is provided with a pair of elongated slots 70 for receiving the prongs of a conventional connector, and a third opening 72 is provided for receiving a ground prong of such connector. It will be understood that when the prongs of a suitable connector are inserted within the openings 70 and 72, they will contact conventional metallic contact members which are operatively connected with the terminals extending upwardly from the removable connector means.

Each of the removable connector means 66 includes a body of insulating material indicated by reference numeral 70 which is molded in surrounding relationship to the electrical connector means therewithin of a conventional nature, and accordingly, members 66 may be considered to be molded socket inserts since they are in fact sockets for receiving conventional electrical connectors and are inserted within the outer ends of the cavities 52 in the body of insulation 34. The electrical connector means 66 is a power outlet as contrasted to a light bulb outlet as hereinafter described.

The body of insulation 70 of each of connectors 66 is provided with an annularly extending groove 74 formed in the outer surface thereof, and a longitudinally extending groove 76 is also formed in the outer surface thereof, groove 76 intersecting groove 74 and extending at substantially right angles thereto.

The interior wall of the projections 50 on the body of insulation 34 is provided with a first annularly extending inwardly directed rib 80 which is adapted to fit snugly within groove 74 when the removable connector means is in operative position for holding the connector means in such operative position. A longitudinally extending rib 82 also is directed inwardly into the cavity and is adapted to fit snugly within groove 76 provided in the connector means for properly aligning the connector means and for preventing relative rotation between the connector means and the walls of the projections 50. It is important to provide the aligning means in order to ensure that the connector means is positioned in the proper manner within the cavity without twisting the conductors 54, 56 and 58.

It will be noted that the lower part of the body portion 70 of each of the connector means is of slightly greater diameter than the upper part thereof, the reduced diameter upper portion being adapted to fit snugly within a wall portion 86 within projection 50, and the enlarged lower part of the body portion 70 fitting snugly within a wall portion 88 defined within projection 50.

Projection 50 also includes a radially inwardly extending annular shoulder portion 90 which positively limits inward movement of the associated connector means. An inwardly extending annular lip 92 is provided at the outer ends of each of projections 50, this inwardly directed lip terminating in a relatively sharp annular edge portion 94 which is adapted to engage the outer surface of an associated removable connector means for providing an effective fluid-tight seal therewith. In this manner, when the light socket is in operative position within the cavity as indicated at the left-hand portion of FIG. 4, a completely fluid-tight and electrically insulated assembly is provided.

A third cavity 98 is provided within the body of insulation 34 intermediate the two cavities 52 previously described, and three additional electrical conductors 100, 102 and 104 extend loosely within this cavity and conductors 102 and 104 are of sufficient length to extend outwardly of the cavity and the adjacent projection 99 for attachment to a suitable connector means hereinafter described. Conductors 100, 102 and 104 are connected with the conductors of the cable in the same manner as described in the aforementioned U.S. patent.

The lower end of conductor 102 is provided with a terminal portion 106 which is secured as by soldering to an annular electrically conductive ground ring 108 formed of brass or similar material and molded into the material of projection 99. The upper portion of the lamp guard 42 is disposed in surrounding clamping engagement with this guard ring so as to provide a ground for the light bulb assembly.

The lower ends of conductors 100 and 104 are connected with terminals 110 and 112 as by means of screws 114, these terminals 110 and 112 extending upwardly from the electrical connector means indicated generally by reference numeral 116. Connector means 116 includes a body of insulating material 120 molded about the electrical components hereinafter described. The lower end of terminal 110 is connected with a contact member 122 fixed within the central portion of a disc-like insulating member 124 which may be formed of a suitable material such as laminated phenolic plastic or the like. This insulating material is in turn clamped within the upper end of a conventional socket or shell 126 having screw threads formed thereon for receiving the usual electric light bulb threads. The other terminal 112 is operative connected with the shell 126.

The projection 99 includes an inwardly extending annular shoulder portion 130 for positively limiting inward movement of the connector means 116. A first annular wall portion 132 of projection 99 is adapted to snugly receive the reduced upper portion of body means 120, while a second annular wall portion 134 within projection 99 is adapted to snugly engage the enlarged diameter lower portion of the body means 120.

An annularly extending groove 140 extends about the outer surface of connector 116, and a longitudinally extending groove 142 is also provided in the outer surface of the connector, groove 142 intersecting groove 140 at substantially right angles thereto.

The inner wall of projection 99 is provided with an annularly extending radially inwardly directed rib 144 and a longitudinally extending inwardly directed rib 146 which intersects rib 144 at substantially right angles thereto.

When connector means 116 is inserted into the operative position shown in FIG. 4, rib 144 fits snugly within groove 140 for holding the connector means in operative position, and rib 146 fits snugly within groove 142 for properly aligning the connector means with respect to projection 99 and for preventing relative rotation therebetween.

The outermost end of projection 99 is provided with an annularly extending inwardly directed lip 150 which is also provided with a relatively sharp inner annular edge as are the lips 92 previously described, whereby lip 150 is adapted to provide an effective fluid-tight seal with the outer surface of connector means 116 when in the operative position shown in FIG. 4.

It is apparent from the foregoing that there is provided according to the present invention portable insulated electric distribution apparatus including removable and replaceable electrical connector means in the form of molded socket inserts which can be readily replaced by hand in the field, only a simple screw driver being necessary for making the necessary connections and disconnections for replacing any one of the various inserts or interchanging them as desired. The arrangement is such that the electric insulated cable retains a structural integrity throughout substantially the length thereof even though a plurality of electric connector means are connected thereto at spaced points along the length thereof. Various types of electrical connector means may be used, and these electrical connector means are interchangeable with one another so that many different combinations of connectors may be employed. Means is provided in association with each of the connector means for providing a ground so as to provide an effective built-in safety feature. The over-all assembly when in operative position provides a completely waterproof arrangement and one which is well insulated from an electrical standpoint. The body of insulation material as well as the projections therefrom and the bodies of insulation of each of the electrical connector means are of a flexible nature, all being formed for example of neoprene rubber of the like which also facilitates the necessary manual deformation of the components as necessary for inserting them into and removing them from operative position.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Portable insulated electric distribution apparatus comprising a body of insulation material having a plurality of electrical conductors embedded within a portion thereof, said body of insulation material defining an unobstructed cavity opening outwardly thereof, said electrical conductors extending within said unobstructed cavity and being loosely received therewithin, said electrical conductors being of sufficient length so as to extend outwardly of the cavity for attaching the conductors to an electrical connector means, a readily removable electrical connector means snugly received within said cavity and held in place solely by frictional engagement, means for connecting said connector means with said conductors, said connector means including a molded second body of insulation material having an annular groove formed therein and a longitudinally extending groove formed therein disposed at substantially right angles to said annularly extending groove and intersecting said annularly extending groove, said body of insulation material defining an annularly extending rib extending into said cavity and a longitudinally extending rib extending into said cavity disposed at substantially right angles to said annularly extending rib, said annularly extending rib fitting snugly within said annularly extending groove in the connector means for holding the connector means in operative position, said longitudinally extending rib extending into said longitudinally extending groove in said connector means for aligning said connector means within said cavity and for preventing relative rotation between the connector means and said first-mentioned body means when the connector means is in operative position.

2. Apparatus as defined in claim 1 wherein said body means defines a lip surrounding the open end of said cavity, said lip extending inwardly for engaging the outer surface of said connector means to provide a fluid-tight seal therewith.

3. Apparatus as defined in claim 2 wherein said inwardly extending lip tapers inwardly to a relatively sharp edge.

4. Apparatus as defined in claim 1 wherein there are three conductors within each of said cavities, at least one of said conductors being connected so as to provide a ground means.

5. Apparatus as defined in claim 1 wherein a plurality of similar cavities are provided within said body means, and a plurality of connector means are provided, each of said connector means being snugly received within an associated cavity to provide a fluid-tight seal with said body of insulation material and including cooperating means for holding the connector means in operative position and for preventing relative rotation of the connector means with respect to said body of insulation material.

References Cited

UNITED STATES PATENTS

| | | | |
|---|---|---|---|
| 1,845,639 | 2/1932 | Wermine | 339—60 |
| 2,015,590 | 9/1935 | Cavanagh et al. | 339—60 |
| 2,306,206 | 12/1942 | Dalgleish | 339—59 |
| 2,534,875 | 12/1950 | Miller | 339—59 X |
| 2,563,762 | 8/1951 | Uline et al. | 339—60 |
| 3,153,119 | 10/1964 | Hart | 339—59 X |

MARVIN A. CHAMPION, *Primary Examiner.*

J. R. MOSES, *Assistant Examiner.*